US006433779B1

(12) United States Patent
Woolman

(10) Patent No.: US 6,433,779 B1
(45) Date of Patent: Aug. 13, 2002

(54) REMOVEABLE, AXIALLY ELONGATED EXTENSION FOR A NON-AXIAL (ROUND) COMPUTER MOUSE OF PRIOR ART

(76) Inventor: Andrew Payne Woolman, 1014 Peralta Ave., Albany, CA (US) 94706

( * ) Notice: Subject to any disclaimer, the term of this patent is extended or adjusted under 35 U.S.C. 154(b) by 0 days.

(21) Appl. No.: 09/420,992

(22) Filed: Oct. 20, 1999

Related U.S. Application Data

(60) Provisional application No. 60/104,939, filed on Oct. 20, 1998.

(51) Int. Cl.[7] ................................................. G09G 5/08
(52) U.S. Cl. ..................... 345/163; 156/164; 156/163; 156/159; 341/20; 341/21; 428/100; 428/99
(58) Field of Search ................................. 345/163, 156, 345/164, 165, 166, 167, 159; 341/20, 21

(56) References Cited

U.S. PATENT DOCUMENTS

| 5,847,696 A | * | 12/1998 | Itoh et al. ................. 345/163 |
| 6,031,522 A | * | 2/2000 | Strand ....................... 345/163 |
| 6,099,934 A | * | 8/2000 | Held ............................ 428/1 |
| 6,256,015 B1 | * | 7/2001 | Adler ......................... 345/163 |
| 6,275,215 B1 | * | 8/2001 | Kim ........................... 345/163 |

* cited by examiner

Primary Examiner—Richard Hjerpe
Assistant Examiner—Ali Zamani

(57) ABSTRACT

An additive device which improves the function of a computer mouse. More specifically one that appends to the form of a round, or otherwise characteristically non-axial computer mouse, such that the user is afforded the axial tactile registration (between hand, mouse, and by extension, on-screen cursor) associated with the more commonly produced elongated-type mouse. A thin shell, flexible plastic (or other) material is cast into a generally elongated form, and is at least partially hollow on the underside so as to clip snugly over and onto the body of the circular mouse. The shell is held in place by friction and/or by the use of tapes, either adhesive or hook & eye type. The button(s) of the host circular mouse remain accessible to the hand of the user, either directly or through the provision of extensions built into the additive shell.

1 Claim, 3 Drawing Sheets

REMOVEABLE, AXIALLY ELONGATED EXTENSION FOR A NON-AXIAL (ROUND) COMPUTER MOUSE OF PRIOR ART

This application claims benefit to U.S. provisional application Ser. No. 60/104,939, filed Oct. 20, 1998.

A removeable, axially elongated extension for a round computer mouse of prior art.

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

The present invention relates generally to being an improvement to a separately manufactured device. It relates particularly to an additive input device (mouse) such as has been manufactured by "APPLE COMPUTER, INCORPORATED" as part of its "G-SERIES" processor desktop personal."

"APPLE COMPUTER, INCORPORATED" Introduced the "IMAC" computer in August of 1998, as part of the first generation of its "G-SERIES" computers. The "G-SERIES" computer has a unique shape and color scheme, involving two colors of translucent plastic to form the outer protective shell of the computer. The same two or similar translucent plastics are used to form the body and button of the computer's mouse, which is molded into a circular, puck-like shape. This circular horizontal cross-section renders the mouse difficult to use as an input device, as the non-axial form causes the user to lose his (her) orientation with the mouse as it will rotate out of axial alignment with the user's hand, thereby causing the electronically linked on-screen cursor to move in unexpected directions. It is likely that other manufacturers will mimic this circular mouse shape in the production of their newer computers, due to the high consumer popularity of the "IMAC" and other "G-series" computers.

This invention improves the circular non-axial mouse by way of a thin-shell plastic (or other) attachment, held in place by friction and/or tapes, and which, once attached, lends to the mouse an overall axial form which corresponds to the axis of vertical movement of the on-screen cursor, and thus orients the hand of the person using the mouse to its proper position for maintaining predictable control of the cursor.

There is substantial prior art in the field of computer input devices, and with respect to mice (or mouses) in particular, and additive accessories for mice (or mouses). U.S. Pat. No. 5,894,302 indicates an original ergonomic design for a complete computer mouse, in an elongated form, predicated upon the comfort and health of the user. Another example of complete mouse design predicated on the comfort and health of the user is U.S. Pat. No. 5,870,081, which provides for user-adjustable tilting of the permanent mouse housing. Neither of these examples indicate a removeable body shape.

Accessory adapters have been proposed for purposes such as allowing foot-control of a computer mouse (U.S. Pat. No. 5,886,685), a very specialized utility, and consequently also not described with economy of production in mind.

Accessory covers have been proposed for the purposes of keeping a host mouse clean: U.S. Pat. No. 5,245,146 proposes a miniature automobile shaped cover which, when assembled, completely contains a host mouse, and where the hood of the automobile acts as an extension of the mouse push-button; U.S. Pat. No. 5,851,623 proposes a hemispherically shaped cover that forms a complete, unbroken membrane over the top side of an elongated mouse, with the mouse's pushbutton operated via the interface of a pliant portion of the cover's wall. Neither of these examples of prior art seeks to improve the function of the mouse. In fact the latter, by nature of its circular design, would create exactly the functional problem that the present invention seeks to improve.

Purely decorative covers have been proposed for computer mouses: USD381015 proposes a felt beret-like cover with an elastic lower rim; USD291203 proposes a mouse (animal)-shaped plush cover. Neither of these designs offer any improvement to the function of the host mouse, and may in fact hinder the normal function of same.

There is thus a need for an inexpensive additive improvement to the circular mouse which alters its feel so as to provide directional feedback to the user through the sense of touch. There is also a need for this improvement to be easily removeable, as not all users of a single desktop computer may find the improvement comfortable to use. Its easy removal may also allow more thorough maintenance and cleaning of the host mouse.

SUMMARY OF THE INVENTION

Accordingly, it is an object of the present invention to provide an additive device which alters the form of a round, or otherwise characteristically non-axial mouse, such that the user is afforded the axial tactile registration (between hand, mouse, and consequently on-screen cursor) associated with the more commonly produced elongated-type mouse.

Another object of the present invention is to provide a method of attaching this additive device which is free of the need for special tools or skills; its attachment is to be achievable by the average computer user.

Yet another object of the present invention is that its attachment be reversible. That is, that it may be removed essentially as simply as it is attached.

Briefly, a presently preferred embodiment of the present invention includes a thin shell, flexible plastic (or other) material which is cast into a generally elongated form, and which is at least partially hollow on the underside so as to clip snugly over and onto the body of the circular mouse. The shell is held in place by friction and/or the use of tapes, either adhesive or hook & eye type. The button(s) of the circular mouse remain accessible to the hand of the user, either directly or through the provision of extensions built into the additive shell.

Among the advantages of the present invention is that it provides a functional improvement to a currently marketed computer input device, the circular (horizontal cross-section) mouse.

Another advantage of the present invention is that its attachment to the host mouse is achievable without the use of special tools or skills.

Still another advantage of the present invention is that its attachment to the host mouse is easily reversible, with little or no altering effect to the host mouse.

These and other objects and advantages of the present invention will become apparent to those skilled in the art after having read the following detailed description of the preferred embodiment.

IN THE DRAWING

In FIGS. 1–5, prior art is indicated by dotted linework, an example of the present invention by solid linework. Prior art is presented to aid in the understanding of the embodiment of the existing manufactured device, to which the present invention is an improvement.

Figure 6:
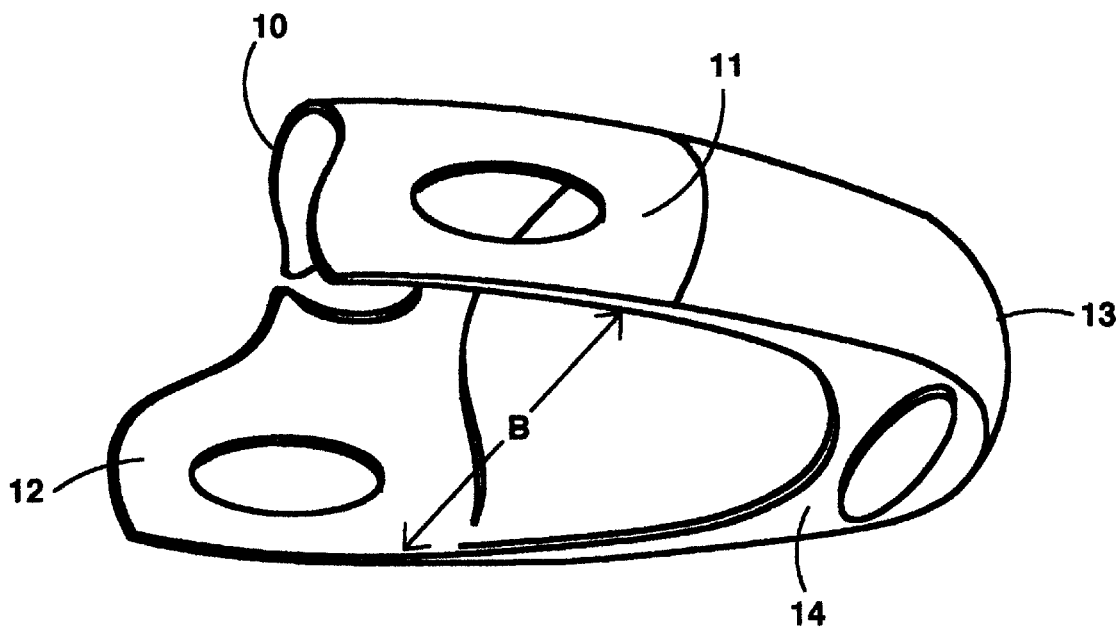
Figure 7:
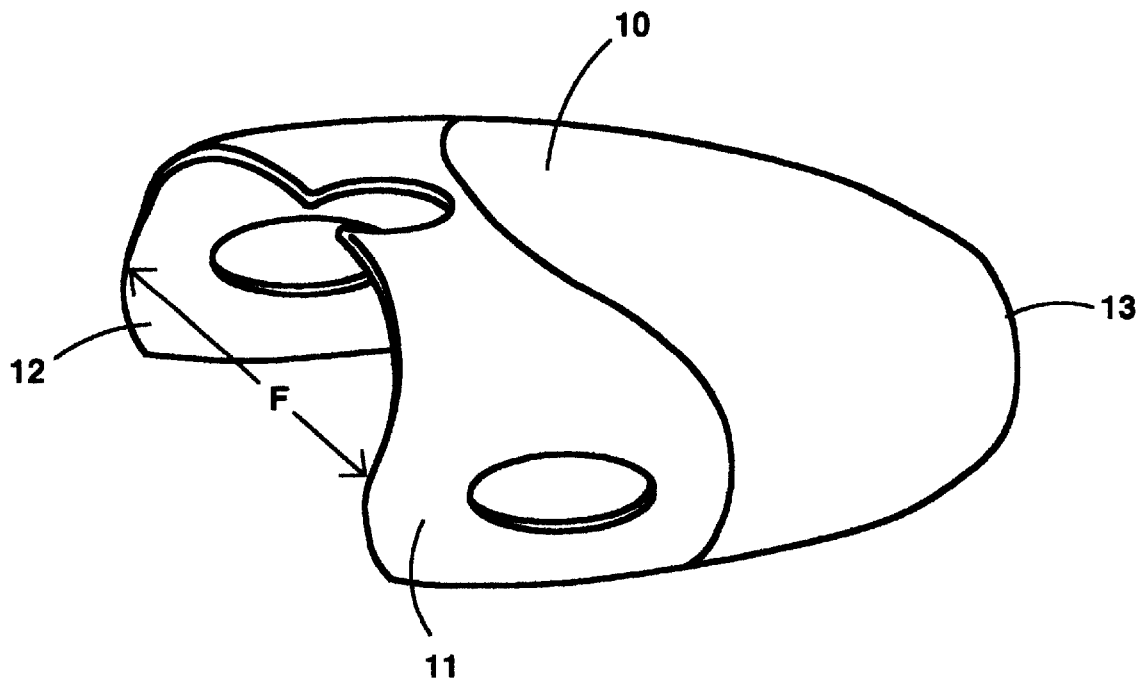

FIGS. 6&7 are three-dimensional projection views of a mouse extension in accordance with the present invention, schematically illustrating the preferred embodiment, and in the absence of a host mouse. FIG. 6 shows the underside; FIG. 7 shows the top side.

DETAILED DESCRIPTION OF THE PREFERRED EMBODIMENT

Figure 1:
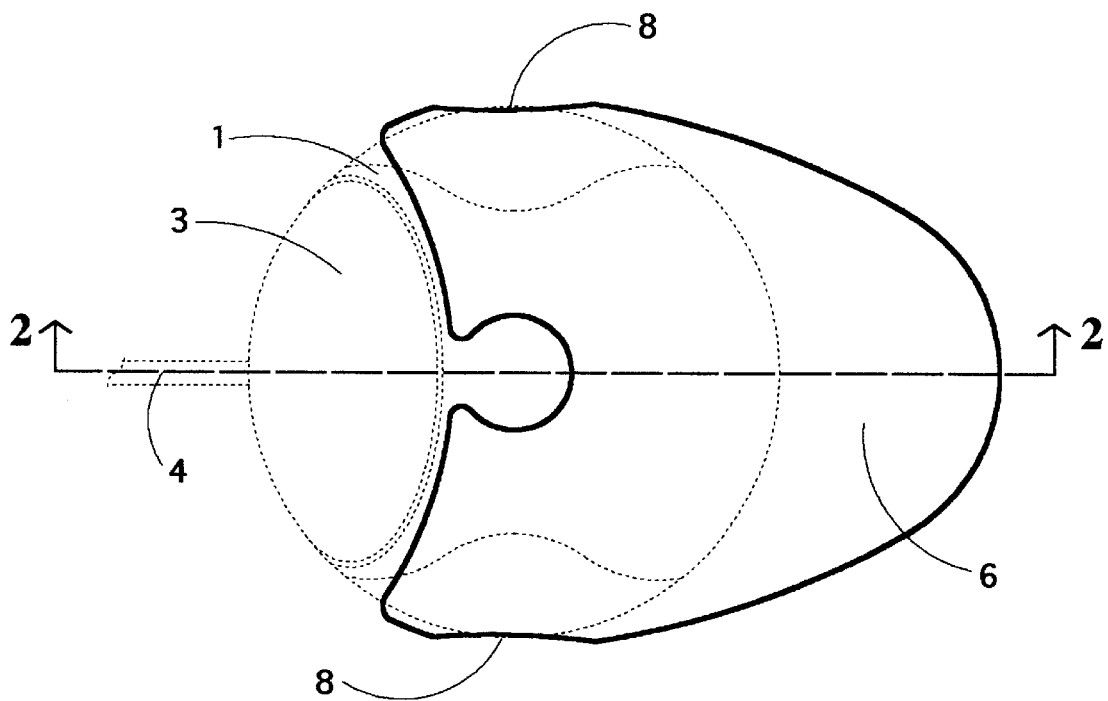
FIG. 1 is a top view of a mouse extension in accordance with the present invention.
Figure 2:
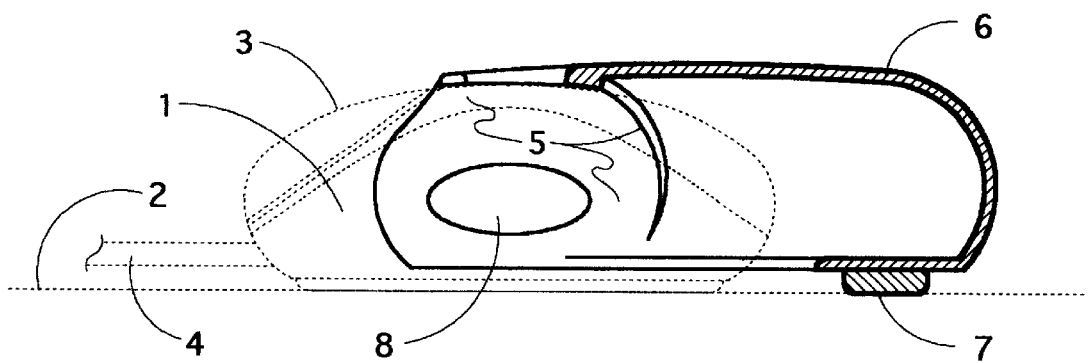
FIG. 2 is a longitudinal section view of a mouse extension in accordance with the present invention.
Figure 3:
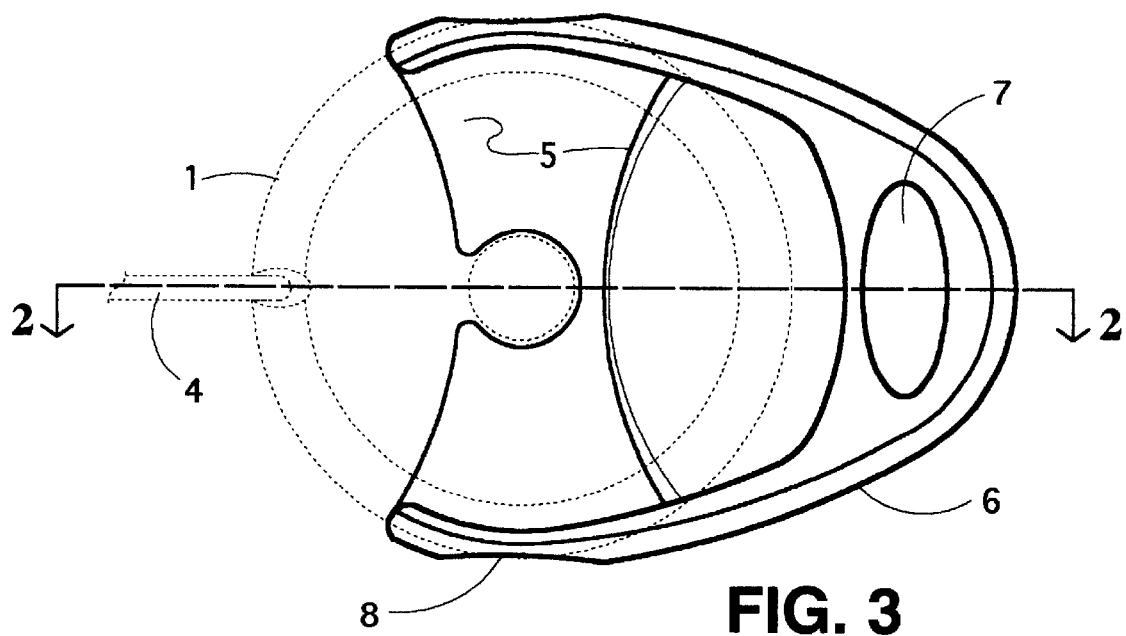
FIG. 3 is a bottom view of a mouse extension in accordance with the present invention.
Figure 4:
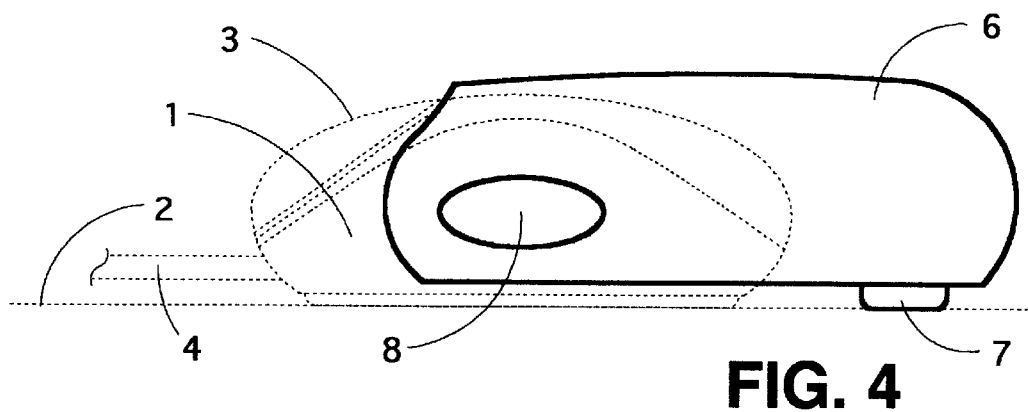
FIG. 4 is a side view of a mouse extension in accordance with the present invention.
Figure 5:
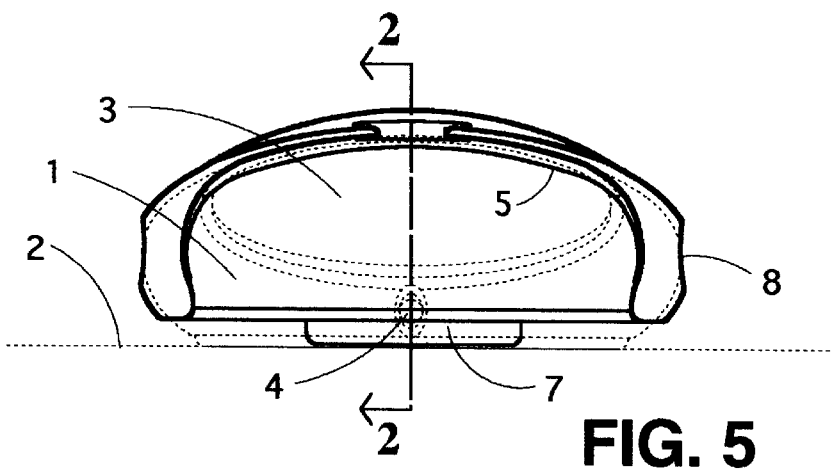
FIG. 5 is a front view of a mouse extension in accordance with the present invention.

Referring now to FIG. 1 and FIG. 2, the present invention and host mouse are represented in top view and section view, accordingly. As is typical of a computer mouse in general, input cues are given to the computer processor by way of the user moving the mouse 1 across a horizontal surface 2 causing a ball inside the mouse to rotate, and which in turn rotates electro-mechanical sensors within the mouse. These sensors control the movement of an on-screen cursor via a digital software interface. In order for this movement to be predictable, the user must maintain an axial registration between his (her) hand and the mouse. Additional cues are given to the computer by way of the user depressing one or more buttons on the mouse 3. The digital cues are transmitted to the computer processor by way of a cable 4, or in some cases, by infrared or other wireless transmission.

Referring now to FIGS. 1–7, an extension to the host mouse is illustrated in various views, in accordance with the present invention (the function and workings of the prior art are to remain as indicated in the above paragraph). As depicted, a thin-shelled resilient plastic (or other material) device is made to fit snugly over the circular form of the host mouse. The device has a front section 5 whose primary purpose is to grip or adhere to the host mouse; the interior surface of this portion of the device is moulded to match the outer form of the host mouse and remains registered with and attached to same by way of friction at the contacting surfaces. This front portion is largely hollow on the bottom and front, so as to allow it to be snapped on to the host mouse from above and behind, by way of temporary flexure as it is pushed into place by the user. Attachment might alternately be achieved by the use of two part demountable products such as hook & eye tape(s) or magnetic tape(s). The device has a rear portion 6, whose primary purpose is to provide an elongated form to the device, and accordingly, to the host mouse. The topside of this rear portion is sized and shaped as to fit comfortably under the palm of the user's hand. The bottom side may be hollow or solid, the preferred embodiment being the former. On the bottom side, near the very rear portion of the device is a skid plate 7, which allows the device to slide across a horizontal surface with the same ease as does the host mouse. This skid plate also elevates the device off of the horizontal surface, so as to prevent snagging and to hold it in co-axial alignment with the host mouse's equator. Moulded holes 8, located in the vicinity of the widest point of the host mouse, may provide a locator for the user's fingers, and also may render the device more comfortable to users with small hands, as the overall grippable width of the device is decreased.

As shown in FIGS. 6 and 7, the extension device is comprised of an elongated top wall 10 with a front end and a rear end. Opposite side walls 11 extend down from opposite sides of top wall 10. Side walls 11 have arcuate interior surfaces 12 adjacent front ends thereof. A rear wall 13 extends down from the rear end of top wall 10. A bottom wall 14 extends forward from a lower end of rear wall 13 and terminates substantially behind the front end of top wall 10. A front opening F fully extends between the front ends of side walls 11, and a bottom opening B fully extends between the lower ends of side walls 11.

I claim:

1. A resilient extension device for attaching to a generally round computer mouse, comprising:

an elongated top wall with a front end and a rear end;

opposite side walls extending down from opposite sides of said top wall, said side walls having arcuate interior surfaces adjacent front ends thereof, each of said arcuate interior surfaces being curved about a longitudinal axis, and curved about a vertical axis;

a rear wall extending down from said rear end of said top wall;

a bottom wall extending forward from a lower end of said rear wall and terminating substantially behind said front end of said top wall;

a skid plate attached under said bottom wall;

a front opening fully extending between said front ends of said side walls; and a bottom opening fully extending between said lower ends of said side walls;

wherein when said extension device is attached to said round mouse:

said arcuate interior surfaces adjacent said front ends of said side walls are closely engaged against similarly arcuate sides of said round mouse for securing said round mouse;

said front end of said top wall is positioned behind a button on said mouse to expose said button, and said rear end of said top wall is positioned substantially behind said mouse for providing a longitudinally elongated gripping surface;

said front ends of said side walls are positioned substantially behind a front end of said mouse;

said front end of said mouse is positioned through said front opening of said extension device;

a bottom of said mouse is positioned through said bottom opening of said extension device;

so that said extension device is arranged to be offset substantially rearward on said round mouse to elongate said round mouse to enable a user to better sense an orientation of said round mouse.

\* \* \* \* \*